Feb. 21, 1933.   J. W. ILIFF ET AL   1,898,054
PRODUCTION OF WHITE LEAD
Original Filed Aug. 10, 1926
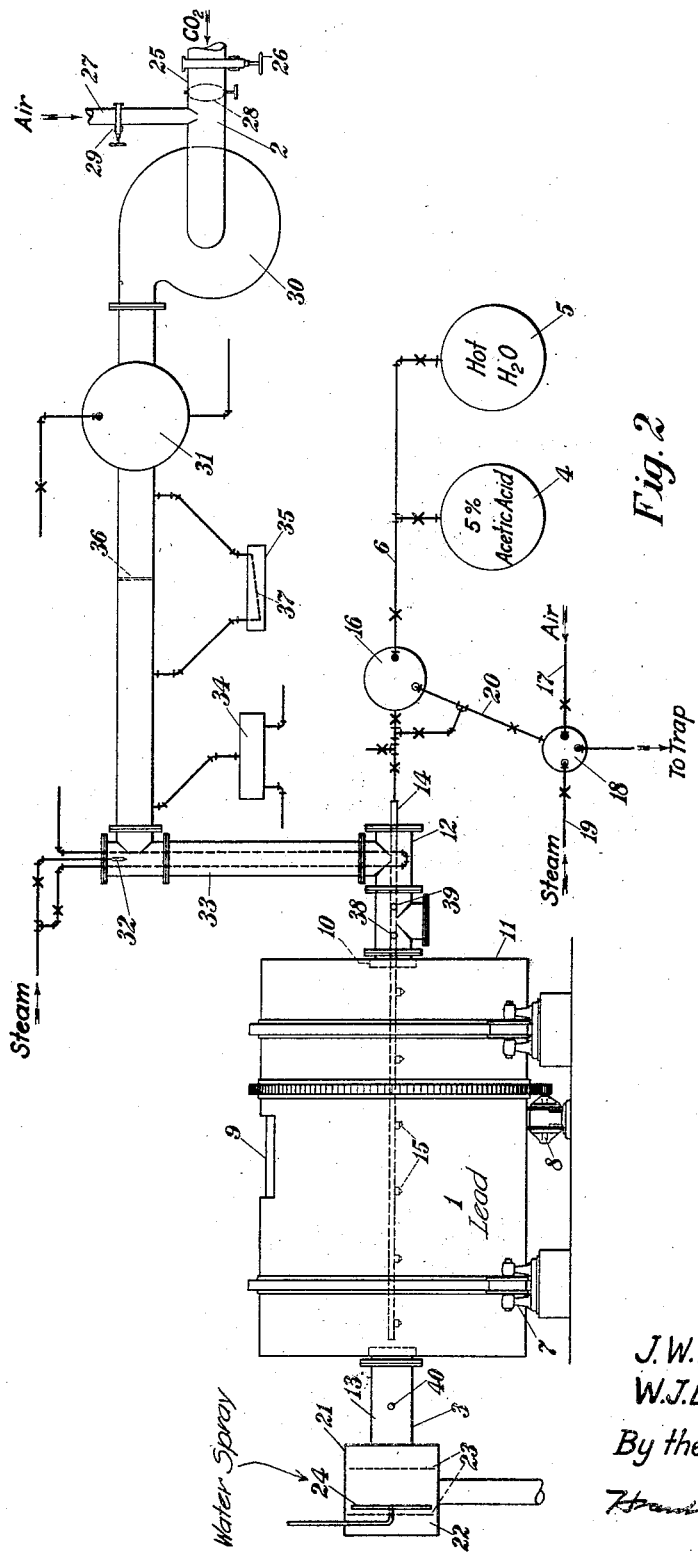
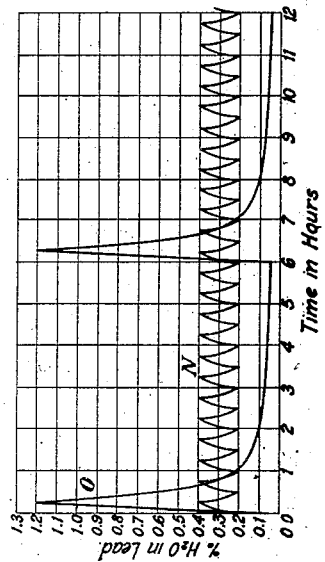
J. W. ILIFF and  } Inventors
W. J. Lindsay     }
By their attorney Patented Feb. 21, 1933

1,898,054

UNITED STATES PATENT OFFICE

JOHN W. ILIFF, OF WILMINGTON, DELAWARE, AND WILLIAM J. LINDSAY, OF NORWOOD, PENNSYLVANIA, ASSIGNORS, BY MESNE ASSIGNMENTS, TO NATIONAL LEAD COMPANY, OF NEW YORK, N. Y., A CORPORATION OF NEW JERSEY

PRODUCTION OF WHITE LEAD

Application filed August 10, 1926, Serial No. 128,352. Renewed February 20, 1929.

This invention relates to the manufacture of white lead, and, in particular, relates to the manufacture of this pigment by the so-called Carter process (see Lead and Zinc Pigments, by Holley, New York, John Wiley and Sons, 1909, Chapter VII, The Carter Process). In this process, granulated, e. g. powdered lead contained in a rotating drum is treated with acetic acid, water, and carbon dioxide and air (oxygen), the chemical reactions being essentially the same as those of the Dutch process, the acetic acid, and the water, reacting with the lead to form lead acetate, and carbon dioxide, water and oxygen (air) reacting with the lead acetate to form basic lead carbonate. In this procedure as usually practiced the time required for converting the lead is unduly long, for example, about twelve days or more. A further disadvantage of the procedure is that it is necessary to interrupt the corrosion, causing a very material loss of time. This interruption is necessary in order to run the material through a pulverizer to reduce lumps and balls so as to place the mass in such condition that the reactions can proceed. A yet further disadvantage of the usual procedure is that the yield is not always satisfactory, this being stated in "Lead and Zinc Pigments", Holley, page 78, as eighty-five to ninety per cent, which figures show that an increase in the percentage of converted lead is highly desirable. These objections have been to some extent reduced by the improved Carter process disclosed in Tolman's Patent 1,447,740, which prescribes a systematic treatment of the lead mass by regulated sprinklings to maintain therein a moisture content of between 2% and 5%, but that process also requires an unduly long time to complete the corrosion.

We have devised a process which, while it embodies the desirable features of the Carter process, such as convenience and simplicity compared to the Dutch process, is such that the conversion time is much shortened, being reduced to but about three days, and at the same time better than ninety per cent conversion is readily obtainable. Balling of the material and the loss of efficiency which results therefrom are overcome and interruption of the process in order to remove the balled material from the drum and disintegrate it is therefore eliminated. It is the major object of the invention to provide a process having the indicated, and other, desirable features. To this end, and also to improve generally upon processes of the character indicated, the invention consists in the various matters hereinafter described and claimed.

In the accompanying drawing, Figure 1 is a partial chart indicating approximately the water content of the lead mass during corrosion, in accordance with the previous practice and in accordance with the present practice; and Figure 2 is a substantially diagrammatic view of an apparatus assembly for the convenient practice of the invention.

In the Carter process as usually carried on, it is the practice, in supplying the water (or acid as the case may be) to supply very large amounts thereof, and at widely separated periods, for example at six-hour intervals. It is also the practice, in drying out the mass so that the basic carbonate may be readily removed from the unconverted lead in order to expose a fresh surface, to dry out the mass quite thoroughly. It is also the practice to dry out rapidly with the result that during most of the time between the water treatments the percentage of water is very low. Thus, as a practical result, the charge is treated at intervals with such an amount of water that balling results from excess of water, slowing up the process and ultimately necessitating the intermediate pulverizing before mentioned, and during most of the time there is not sufficient water present to properly carry on the reaction. (As an example of usual factory operation—during the water treatment, the water content rises as high as 1.2% of the moistened mass, then in the next hour falls below .2% and continues under that percentage for the rest of the six hour period during which time it falls further until it reaches .05%, or below, where it remains until the period ends, and then is suddenly increased to 1.2%, and so on, as substantially indicated by the line "0" in Figure 1.) In Figure 1, the chart covers but 12 hours but it will be understood that the continuations of the plots would be but repetitions of the portions shown. Merely increasing the frequency of sprinkling, proposed in the Tolman patent does not of itself remove the loss of material and time resulting from the tendency of the moist mass to form into balls, unless, as we have found, the rate and extent of moisture change is properly regulated and controlled.

In the present process the use of large amounts of water is avoided, and furthermore, reduction of the water content of the mass to such a point that the reactions are delayed is also avoided. As a result, not only can the process be carried on without the delays and inefficiency due to balling, but, furthermore, rapid conversion of the lead can be carried on during all the treating time.

In accordance with the present invention, the lead is sprayed at frequent intervals, say about every half hour, with a relatively small amount of water (or acid) at each spraying, the amount of water being such, in relation to the amount of material present, that the percentage of water in the mass approximates 0.4% and preferably does not rise above 0.7%. Also, the drying out is so controlled that the percentage of water does not fall substantially below 0.2%. These conditions are substantially indicated by the line "N" in Figure 1, the percentages being by weight referred to the moist corroding mass as a percentage base. As the preferable method of controlling the drying out, we closely control the humidity at entrance of a current of gas passed through the drum in which the lead is being treated, such gas being conveniently the stream of carbon dioxide and air used in converting the basic lead acetate to basic lead carbonate. With the humidity of the entering gas stream thus known and controlled, and with conditions within the drum also known, the amount of water removed from the mass can be closely regulated and the desired percentage limits closely adhered to.

The liquid, acetic acid or water as the case may be, is sprayed upon the lead, at suitable intervals, the time between sprayings ranging substantially between twenty minutes and two hours, one-half hour intervals being desirable, as mentioned above, the spraying itself taking only such time as is necessary to supply the liquid, say five or ten minutes at each spraying period, depending upon the amount of liquid, head, and type of spray nozzle, etc. We have found it desirable to use a fine mechanically provided spray, such for example as that given by a spray nozzle that substantially atomizes the liquid and gives a conical wide-angle discharge, a suitable number of these nozzles being used in the drum, and they being so located, as to uniformly spray the charge.

The percentages between which it is desirable to hold the liquid content of the mass, especially at the start of the run, will vary somewhat with the fineness of the lead, the coarser the lead the higher the permissible moisture content, more particularly at the upper limit of the range. For example, while the range 0.2 to 0.4%, above given, is best for lead of a size such that about 1% will remain on a 10 mesh screen and 40% pass a 325 mesh, if lead of a size such that 1% will remain on a ten mesh screen and 10% pass a 325 mesh the liquid content of the lead for optimum conditions may well be between 0.2 and 0.5%.

It thus appears that the optimum moisture content for lead of one stated fineness is between 0.2 and 0.4% and that for lead of another stated fineness it is between 0.2 and 0.5%, and it has been noted earlier in the specification that the moisture content "preferably does not rise above 0.7%" and "does not fall substantially below 0.2%". Since 0.7% moisture content is sufficient to insure active corrosion, increase of moisture content beyond that percentage is needless and confers no advantage, but on the contrary entails delay and, on continued rise of the percentage, risk of balling, and since 0.2% moisture content is insufficient to interfere with the ready rubbing off of the corroded material from the lead particles, further reduction of moisture is unnecessary and does no good, but on the contrary means waste of time and money with a possibility, increasing as the percentage falls, of dusting, i. e., loss of white lead powder carried off in the gas flow.

In using a gas stream as an adjunct to, and in combination with, the frequent spraying of moderate amounts of liquid, to control and determine the amounts of liquid in the mass, we have found it desirable to use a gas having an absorbing power of about 90 grams of water per cubic meter of gas (measured at 20° C.), and to use a quantity of this gas sufficient to absorb 4 to 8 pounds of water per hour per ton of lead. Thus, with a 16,000-pound charge, and a gas of such absorbing power, a gas flow of about 150 cubic feet per minute (measured at 20° C.) is satisfactory. In fixing upon a proper gas flow, it will be understood by those skilled in the art that allowance can be made for the heating of the gas in the drum by the heat of the reactions. For instance, the entering gas may have an absorbing power of 6.5 pounds of water per hour per ton of lead, but the heat of the reactions (up to the last four or five hours of the run, when it would be less) may heat up the gas sufficiently to increase its absorbing power so that an additional 1.5 pounds of water would be absorbed per hour per ton of lead, giving a total of 8 pounds. As will be understood, the relative humidity of the supplied gas should be varied in correspondence with any variations of temperature in order to maintain the moisture-absorbing power of the gas constant. We have $$\text{Sq. ft. per min. per ton} = \frac{\text{Diam. drum ft.} \times \pi \times \text{length drum ft.} \times \text{R. P. M.}}{\text{weight of lead in tons}}$$

obtained excellent results with gas of about 75% relative humidity at 70° C., that is, a gas having a dry bulb temperature of 70° C. and a wet bulb temperature of 65° C., such a gas having the mentioned desirable absorption power of about 90 grams per cubic meter measured at 20° C. As before indicated, the gas stream of carbon dioxide which is passed through the drum to react (together with oxygen and water) with the lead acetate to form the basic lead carbonate is used to control the amount of liquid, and must therefore be below saturation. The carbon dioxide and air gas stream preferably should have a $CO_2$ content between 7 and 11%, and we have found about 8.5% a generally desirable figure.

The gas stream ($CO_2$ and air), instead of being delivered saturated direct from scrubbers as formerly is given the proper moisture content before entering the drum. Conveniently for close control of the humidity of the gas, steam is supplied thereto, prior to its entrance to the drum, in quantity to give 100% saturation at a given temperature below that at which the gas is to have in the drum, and by means of a suitable heater, as a steam coil, the gas is superheated to sufficiently give the desired relative humidity and temperature. For example, the gas may be 100% saturated at 65° C. and then superheated to about 70° C. (the temperature in the drum or "reel") thus giving a relative humidity of about 75% at this temperature, as before mentioned as desirable. The moisture absorbing capacity of the gas is readily determined by reference to hygrometric tables. The relative humidity and temperature of the gas controlled as mentioned above may be conveniently determined by the use of wet and dry bulb thermometers in the gas stream.

As a further feature of the practice of our invention we preferably so operate as to expose much more surface of the lead mass per unit time to the action of the gas and liquid, than is the usual practice in the Carter process. Thus, the surface may well be conveniently two to six times that exposed in the usual Carter process; for example, we expose about 40 sq. ft. per minute per ton charge in contrast to but about 10 sq. ft. per minute per ton charge, as the Carter process is usually practised. We find that with a suitable size drum and charge and sufficiently rapid rotation of the drum, the exposure we desire can be readily attained. For instance, a drum having a length of twelve feet and a diameter of eight feet rotated at 1 revolution per minute with a charge of sixteen thousand pounds, will give an exposure of about 40 square feet per minute per ton.

As a practical example of operation in accordance with the process we give the following:—

A drum was used 8 feet in diameter by 12 feet in length equipped with six one-millimeter Schutte and Koerting spray nozzles, and with connections for supplying acetic acid, and water to the spray nozzles, and for passing through the drum a properly humidified current of air containing carbon dioxide. The charge was 16,000 pounds of lead powder of such size that 1% remained on a ten mesh screen and 40% passed a 325 mesh (and 15% remains on 80 mesh; 14% on 150 mesh; 9% on 240 mesh; and 21% on 325 mesh). After the manhole of the drum was closed, and before the introduction of acid, humidified gas was passed for one-half hour in order to somewhat dampen the lead, the drum being rotated meanwhile. The run was then made, it lasting 72 hours, the drum being rotated continuously throughout the run at about 1 revolution per minute, and gas, containing 8½% $CO_2$ by volume and 75% saturated at 70° C. (the temperature in the drum) being passed at the rate of 150 cubic feet per minute (measured at about 20° C.), continuously throughout the run. Throughout the run, except at the end of the seventy-second hour, the charge was sprayed at one-half hour intervals, there thus being, of course, 144 spraying periods, period "1" being at the beginning of the first half hour of the run. A spray of either 5% acetic acid or hot (80°C.) water was used at each period, and at certain periods both were used, the acid being sprayed first and then being immediately followed by water. The amount of water sprayed at any one time did not exceed eight gallons, and the acid did not exceed seven. The reactions involved are, of course, familiar to those skilled in the art. Acid and water were used as necessary for these reactions, that is:—The acid was sprayed,—7 gallons at periods number 1, 2, 3, 4, 19 and 20; 6 gallons at periods 9, 10, 11, 12, 29, 30, 41, 42, 55, and 56; 5½ gallons at periods 69, 70, 83 and 84; 5 gallons at periods 97, 98, 111, 112, 125, 126, 139, 140. The water was sprayed,—8 gallons at periods 5, 6, 13, 14, 21 and 22; 7½ gallons at periods 31 and 32; 7 gallons at periods 7, 8, 15, 16, 23, 24, 25, 26, 33, 34, 71 and 72; 6½ gallons at periods 35, 36, 37, 38, 43, 44, 57 and 58; 6 gallons at periods 17, 27, 39, 45 to 53 inclusive, 59 to 67 inclusive, 73 to 81 inclusive, 85 to 95 inclusive, 99 to 109 inclusive, 113 to 123 inclusive, and 127 to 137 inclusive; 5½ gallons at periods 141, 142, 143 and 144; 2 gallons at periods 1, 2, 3, 4, 9, 10, 11, 12, 18, 28, 29, 30, 40, 54, 68, 82, 96, 110, 124 and 138; 1½ gallons at periods 19, 20, 41 and 42; 1 gallon at periods 55, 56, 69, 70, 83, 84, 97, 98, 111, 112, 125, 126, 139 and 140. The actual spraying occupied about 5 or 10 minutes of each period, depending on the amount of liquid sprayed. The remainder of the half hour constituted drying out time. This drying out is necessary so that the lead particles may have removed from them by abrasion the white lead formed during the damp period. This removal will not take place if the lead mass be too damp, nor unless its moderate moisture content is reduced promptly, that is, within limits of the general order indicated above. We believe the theory of our process to be first, that for its optimum operation no greater moisture content is used than is necessary for a reasonably active corrosive reaction and second, that such moisture content is then reduced so promptly, and to such a condition of dryness, that the carbonate which has formed on or adhered to the metal granule is readily rubbed off by the continuous tumbling instead of gathering additional carbonate and building up into a hard ball or lump which would have to be threshed or ground in order to expose again the interior metal. Such prompt reduction of moisture is readily accomplished by using a relatively dry gaseous reagent having less humidity than heretofore customary in the practice of the Carter process.

Under these conditions of operation the liquid content of the mass was readily held between .4% at each time of spraying and 0.2% at the end of each drying out time, the percentage at no time falling outside these limits. At the conclusion of this run, which it will be noted was but three days, the lead was found to be practically 100% converted into white lead.

In Figure 2, the illustrated assembly comprises the drum or "reel" 1 wherein the lead is treated, the gas supply line 2, gas exit line 3, and the acid supply tank 4, and hot (80° C.) water supply tank 5, with suitable connections 6, to the drum 1. The drum 1, rotatably mounted on the bearings 7 and driven by the motor 8, is provided with the manhole 9 for charging and emptying and with stuffing boxes as 10 in its heads 11 for the gas-tight introduction of the gas pipes 12 and 13, the drum being rotatable with respect to the gas pipes and the hereafter mentioned pipe 14. The exteriorly mounted acid resistant pipe 14 of the liquid supply line 6 extends interiorly of the drum and carries the spray nozzles 15. These nozzles are of such spread and in such number as to adequately cover the charge; for example, in a drum twelve feet in length may be used six equally spaced nozzles each giving a spray two feet in diameter. The nozzles are of any type giving a fine, substantially atomized, spray, that type comprising a tapered nozzle pipe with an interior spiral vane giving the liquid a spiral form being satisfactory. (For example, one millimeter Schutte and Koerting Company nozzles may be used, as illustrated in Catalog 6, Section A, January 1, 1920, page 3).

The liquid supply line 6 includes the blowcase 16 whereby the acid and water are measured and forced under suitable pressure to the sprays, such blow-case being supplied with air under pressure fed through the pipe 17 over the air heater 18 (heated by steam from the pipe 19), and to the blow-case by the pipe 20. The gas exit line 3 includes a scrubber 21 of any suitable type for collecting any lead dust that may be carried out of the drum, the illustrated scrubber being shown as a chamber 22 with baffles 23 and water spray 24.

The gas supply line 2 includes the main pipe 25, controlled by the gas gate 26, for carbon dioxide received from any suitable source, as a coke furnace, the connected air pipe 27, ahead of the damper 28 and controlled by the air gate 29, for introducing diluting air into the carbon dioxide, the driven fan 30, the scrubber 31 of any suitable type, the steam jet 32 for introducing steam to increase the moisture content of the gas, and the steam heated coil 33 for heating the gas to a temperature to give the relative humidity desired, as herebefore described. Suitable measuring instruments are provided as called for, as will be understood; for example, $CO_2$ recorder 34, gas measurer 35 (comprising orifice plate 36 and differential draft gauge 37), dry and wet bulb thermometers 38 and 39, and dry bulb thermometer 40. Also, of course, suitable control valves are provided as called for as approximately and variously indicated at "X" in the drawing.

In referring to the "water" content of the lead mass, and the like, it will, of course, be understood that we have reference to total water, that is, not only the water supplied as such but also that supplied as water content of the dilute acetic acid. The acetic acid per se present is evidently practically a negligible factor so far as balling and so on are concerned as it is but a very small per cent of the total liquid present; indeed the "total liquid" and the "total water" are substantially the same for practical purposes.

We claim:

1. In the production of white lead by the corrosion of granular lead with liquid and gaseous corroding agents including uncombined water, $CO_2$, and acetic acid, the process which comprises agitating the lead mass and subjecting it to a continuous succession of moistening and drying cycles repeated at short intervals not exceeding two hours while maintaining the varying moisture content of the lead mass between a maximum of .7% and a minimum low enough to permit rubbing off of the corroded material without excessive dusting.

2. In the production of white lead by the corroding of granulated lead with a corroding agent including uncombined water and a current of reactive gas containing $CO_2$, tumbling the lead mass as a result of a rotary motion and subjecting it to a continuous succession of moistening and drying cycles while maintaining the varying moisture content of the lead mass below a maximum of substantially .4%, and above a minimum of substantially .2%.

3. The process of producing white lead by the corroding of granulated lead comprising agitating the lead by tumbling in a container with acetic acid and uncombined water while passing through the container a current of air and carbon dioxide, spraying the lead mass with aqueous reagent at intervals substantially between one-half and two hours, in such quantity, and coordinating the spraying with the humidity of the gas current, as to maintain for the moisture content of the lead mass a range of the order of .2 to .7 per cent by weight of the moistened mass.

4. The process of making white lead which comprises agitating a mass of granular metallic lead in the presence of liquid and gaseous reagents having a corrosive action on lead and including $CO_2$, and subjecting such mass to frequent, brief and substantially regular moistening and drying cycles while holding the moisture content between a maximum insuring adequate corrosion of the lead by substantially preventing the production of hardened balls and a minimum permitting rubbing off of the corroded material from the lead particles but not such as to cause appreciable loss by dusting in the agitation of the mass, the moistening being effected at intervals of not over two hours by fine high pressure spraying of the material and the drying with the aid of a drying current of gases quickly reducing the moisture content after each spraying to permit prompt rubbing off of the corroded product.

5. In the production of white lead by the corroding of granulated lead tumbled in a rotating container with corroding agents including uncombined water, acetic acid and in the presence of a current of $CO_2$ and air, the process which consists in subjecting the lead mass to a succession of moistening and drying cycles wherein its moisture content varies alternately between substantially .7 and .2 per cent by weight of the corroding mass, maintaining the temperature in the container at approximately 70° C. and the relative humidity of the atmosphere in the container at approximately 75 per cent, and so agitating the lead mass as to expose to treatment at least approximately 40 square feet per minute per ton of lead.

In testimony whereof we affix our signatures.

JOHN W. ILIFF.
WILLIAM J. LINDSAY.

CERTIFICATE OF CORRECTION.

Patent No. 1,898,054.                               February 21, 1933.

JOHN W. ILIFF, ET AL.

It is hereby certified that error appears in the printed specification of the above numbered patent requiring correction as follows: Page 5, line 41, claim 4, for "by" read "but"; and that the said Letters Patent should be read with this correction therein that the same may conform to the record of the case in the Patent Office.

Signed and sealed this 9th day of May, A. D. 1933.

(Seal)                                                  Acting Commissioner of Patents.